J. Schaffer,

Capstan.

No. 2,437. Reissued Jan. 1, 1867.

Witnesses.
Geo. N. Thomas
Geo. W. Gladd

Inventor.
John Schaffer. By his
Attorney James L. Johnston

AM. PHOTO-LITHO. CO. N.Y. (OSBORNE'S PROCESS)

United States Patent Office.

JOHN SCHAFFER, OF ST. LOUIS, MISSOURI.

*Letters Patent No.* 15,954, *dated October* 21, 1856; *reissue No.* 488, *dated August* 25, 1857; *reissue No.* 2,437, *dated January* 1, 1867.

IMPROVED CAPSTAN FOR STEAMBOATS.

The Schedule referred to in these Letters Patent and making part of the same.

TO ALL WHOM IT MAY CONCERN:

Be it known that I, JOHN SCHAFFER, of West Manchester, in the county of Allegheny, and State of Pennsylvania, but now of St. Louis, in the county of St. Louis, and State of Missouri, have invented a certain new and useful improvement in "Steam Capstan;" and I do hereby declare that the following is a full, clear, and exact description thereof, reference being had to the accompanying drawings, and to the letters of reference marked thereon.

Prior to the date of my invention, perpendicular capstans placed on the deck of steamboats, and forward of the steam boilers of said boats, were operated by means of hand levers, (capstan bars,) which mode of operation required very hard labor and exposed the deck hands, while in the act of sparring off the boat, when "aground" or stranded, to the dangers which accompany the breaking and falling of spars and the snapping of the boat and spar-lines. Now, the object of my invention is to provide means for avoiding this hard labor and the danger attendant upon operating the capstan with hand levers.

The nature of my invention consists in placing a perpendicular capstan on the deck of the boat, forward of the steam boilers, and connecting it by suitable means with an auxiliary engine, placed either above or below deck; the whole being operated substantially in the manner hereinafter described.

To enable others skilled in the art to make and use my invention, I will proceed to describe its construction and operation. In the accompanying drawings, which form part of my specifications—

Figures 1, 2:
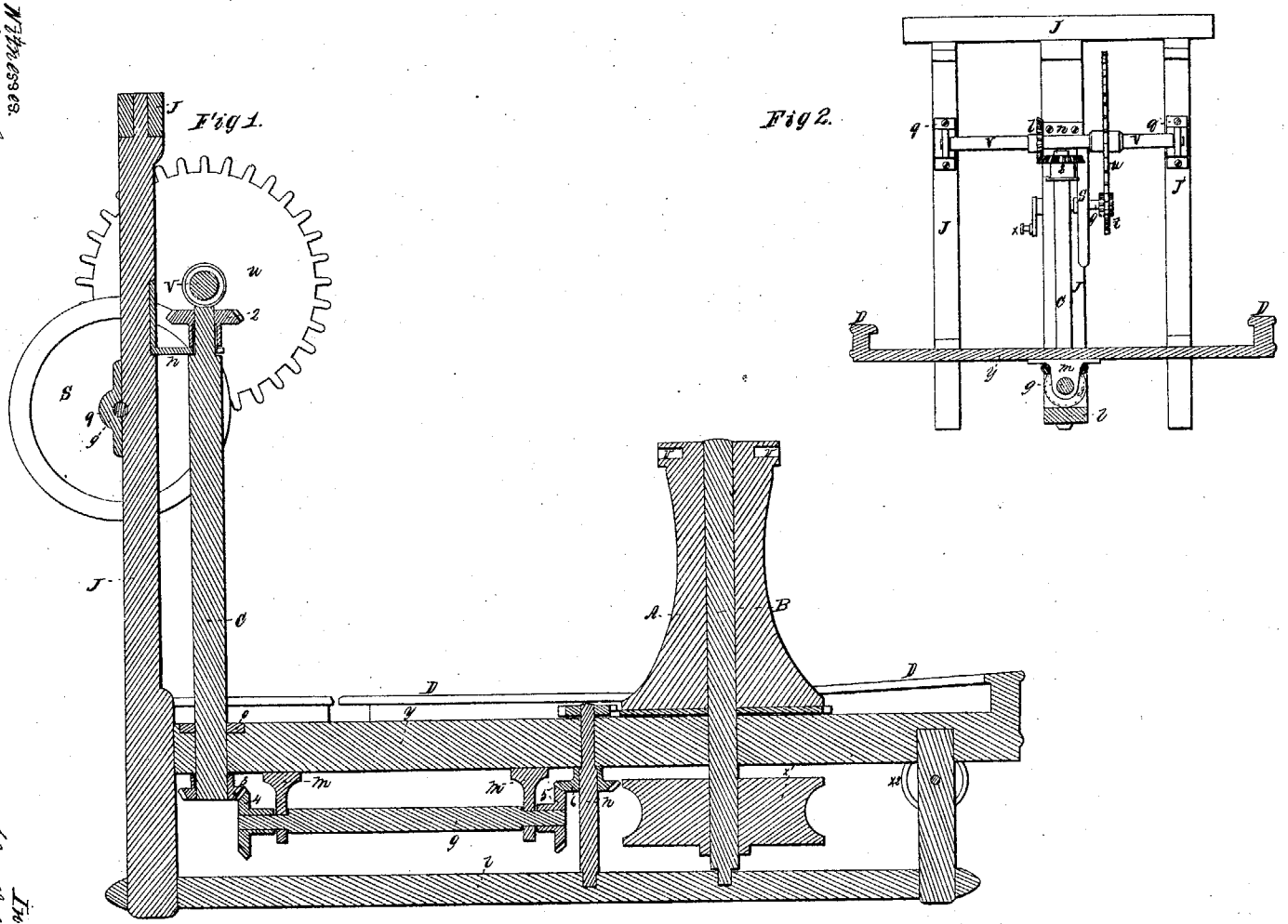
Figure 1 represents a sectional view of the front end of a western steamboat furnished with my improvement.
Figure 2 represents a transverse section of the same.

In the drawings, *y* represents the deck of the boat; D represents the deck guards; J represents the timbers which form what is termed the "gallows frame," to which are attached the bearings *q* for the shafts 9 and V. On the shaft 9 are placed a crank, *x*, balance-wheel, *s*, and small gear-wheel, *t*, which gears into the wheel *u* on the shaft V, which is also provided with a bevel-wheel, 1, which gears into a bevel-wheel, 2, on the upper end of the shaft C, which has its bearings in parts marked *o* and *n*. On the lower end of the shaft C is a bevel-wheel, 3, which gears into a bevel-wheel, 4, on the end of the shaft *g*, which is held in position by hangers, *m*, secured to the under side of the deck *y*. On the forward end of the shaft *g* is placed a bevel-wheel, 5, which gears into a bevel-wheel, 6, on the shaft *h*, on the upper end of which is a small wheel, *f*, which gears into a wheel, *e*, on the lower end of the capstan barrel A, which is secured on the spindle B, which has its bearings in the deck *y* and timber *l*. The spindle B may be provided with a drum, as indicated at $x^1$. This drum, in connection with the guide pulley $x^2$, may be used for taking up the rope as it winds off the capstan barrel A. In the deck *y*, directly over the pulley $x^2$, is an opening. Now, when the drum $x^1$ is used, the cable or chain, as it winds off the capstan barrel, is passed down through the opening in the deck on to the pulley $x^2$, and from it to the drum $x^1$, and the revolving of the drum will wind up the cable or chain as it winds off the capstan barrel, and thereby keeps the deck clear and saves the labor of the men that in the ordinary mode are required for coiling and stowing away the cable and chain as it winds off the capstan barrel. The auxiliary engine, which is placed forward of the steam boilers, which engine is ordinarily used for hoisting freight out of the hold of the vessel, and for otherwise handling freight, and is known among boatmen, by cant phrase, as the "little nigger engine," this engine is connected to the crank *x* of the shaft 9, and imparts motion to it, which motion is imparted to the shaft V through the medium of the wheels *t* and *u*. This shaft V, armed with drums, was used prior to the date of my invention for hoisting freight from and lowering freight into the hold of the boat. Now, I conceived the idea of making this auxiliary engine (little nigger) do more than handle freight, to wit: work the capstan, hoist spars, and do such other things as may be connected with sparring boats off sand bars, and otherwise handling the boat while navigating shallow and intricate rivers and water channels. This I accomplish by placing on the shaft V a bevel-wheel, 1, and then connecting therewith other wheels, and through the medium of said wheels and suitable shafting imparting to the capstan the desired motion, which motion is imparted in the following manner: The wheel 1 revolves the wheel 2, which will revolve the shaft C and wheel 3, which will revolve wheel 4 and shaft *g*, which will revolve wheel 5, which will revolve wheel 6 and shaft *h*, which will revolve wheel *f*, which will revolve the wheel *e* and the capstan barrel A and its spindle B, with drum attached to it. The openings *r* in the top of the capstan barrel are used for operating the capstan barrel by hand levers, in which case the small wheel *f* is removed off the shaft *h*, which will disconnect the capstan barrel and its spindle from the other parts of the driving gear between the capstan and the "little nigger engine."

Now, I wish it clearly understood that I do not claim broadly operating a capstan by steam, for that has been done by connecting the capstan with the main engine of the boat, through the medium of cables and other device.

Having thus described the nature, construction, and operation of my improvement, what I claim as of my invention, is—

The arrangement of the capstan barrel A with the wheels *e*, *f*, 6, 5, 4, 3, 2, and 1, provided with suitable shafting, when said wheels and shafting are used for connecting and rotating a capstan barrel by an auxiliary engine, said capstan and auxiliary engine being placed forward of the steam boilers on the bow of the boat, substantially as herein described and for the purpose set forth.

JOHN SCHAFFER.

Witnesses:
JAMES J. JOHNSTON,
ALEXANDER HAYS.